US012704708B2

(12) United States Patent
Ravizza

(10) Patent No.: US 12,704,708 B2
(45) Date of Patent: Aug. 11, 2026

(54) WIDEFIELD CATADIOPTRIC MONOLITHIC TELESCOPES

(71) Applicant: Lawrence Livermore National Security, LLC, Livermore, CA (US)

(72) Inventor: Frank Ravizza, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 813 days.

(21) Appl. No.: 17/654,775

(22) Filed: Mar. 14, 2022

(65) Prior Publication Data

US 2023/0288692 A1 Sep. 14, 2023

(51) Int. Cl.
*G02B 23/02* (2006.01)
*G02B 17/08* (2006.01)

(52) U.S. Cl.
CPC ......... *G02B 23/02* (2013.01); *G02B 17/0808* (2013.01)

(58) Field of Classification Search
CPC .......................... G02B 17/086; G02B 17/0856
See application file for complete search history.

(56) References Cited

U.S. PATENT DOCUMENTS 4,342,503 A 8/1982 Shafer
4,619,502 A 10/1986 Bagby
5,149,970 A 9/1992 Whitney
5,221,364 A 6/1993 Hotaling
5,260,962 A 11/1993 Hotaling
5,308,533 A 5/1994 Hotaling et al.
5,358,776 A 10/1994 Hotaling
5,360,572 A 11/1994 Hotaling et al.
5,471,346 A 11/1995 Ames
5,948,535 A 9/1999 Chiurlo et al.
6,061,175 A 5/2000 Watters
6,493,878 B1 12/2002 Kassatly
(Continued)

FOREIGN PATENT DOCUMENTS

KR 20160059302 A 5/2016
WO WO-2020153356 A1 * 7/2020 ......... G02B 17/0808

OTHER PUBLICATIONS

Notice of Allowance received in U.S. Appl. No. 17/565,314 dated Nov. 21, 2024, pp. all.

(Continued)

*Primary Examiner* — Christopher Stanford
(74) *Attorney, Agent, or Firm* — Workman Nydegger

(57) ABSTRACT

In one aspect, an apparatus includes a first aspheric refractive surface defined by a first polynomial and positioned to receive input light, and a first aspheric mirror surface comprising a first reflective coating, the first mirror surface defined by a second polynomial and positioned to receive light from the first aspheric refractive surface. The apparatus includes a second aspheric mirror surface comprising a second reflective coating, the second aspheric mirror surface defined by a third polynomial and positioned to receive light from the first aspheric mirror surface, and a second aspheric refractive surface defined by a fourth polynomial and positioned to receive light from the second aspheric mirror surface, wherein the first aspheric refractive surface, the first aspheric mirror surface, the second aspheric mirror surface, and the second aspheric refractive surface are arranged to have a fixed alignment with respect to each other as part of a monolithic structure.

15 Claims, 17 Drawing Sheets

(56) References Cited

U.S. PATENT DOCUMENTS

| | | | | |
|---|---|---|---|---|
| 7,391,580 | B2 * | 6/2008 | Maresse | G02B 17/004 359/728 |
| 7,843,650 | B1 | 11/2010 | Roberts | |
| 8,256,910 | B2 | 9/2012 | Odhner | |
| 8,461,529 | B2 | 6/2013 | Hunter | |
| 8,511,842 | B1 | 8/2013 | Sacco | |
| 9,327,460 | B2 | 5/2016 | Biver et al. | |
| 9,720,223 | B2 | 8/2017 | Riot et al. | |
| 9,862,140 | B2 | 1/2018 | Lewicki et al. | |
| 9,864,179 | B2 * | 1/2018 | Choi | G02B 3/02 |
| 9,944,016 | B2 | 4/2018 | Lewicki | |
| 9,995,507 | B2 | 6/2018 | Norman et al. | |
| 10,146,034 | B2 * | 12/2018 | Choi | H04N 23/687 |
| 10,173,410 | B2 | 1/2019 | Nardiello et al. | |
| 11,084,223 | B2 | 8/2021 | Lewicki et al. | |
| 11,803,001 | B1 | 10/2023 | Essinger-hileman et al. | |
| 12,099,217 | B2 | 9/2024 | Pomerantz et al. | |
| 12,265,214 | B2 | 4/2025 | Ravizza | |
| 2004/0056376 | A1 | 3/2004 | Coronado | |
| 2006/0132908 | A1 | 6/2006 | Baun et al. | |
| 2009/0268983 | A1 | 10/2009 | Stone et al. | |
| 2010/0091396 | A1 | 4/2010 | Hutson et al. | |
| 2013/0057971 | A1 * | 3/2013 | Zhao | G02B 13/06 359/731 |
| 2014/0198222 | A1 | 7/2014 | Blanc et al. | |
| 2016/0187630 | A1 * | 6/2016 | Choi | G02B 17/086 359/731 |
| 2017/0015060 | A1 | 1/2017 | Lewicki et al. | |
| 2018/0243988 | A1 | 8/2018 | Lewicki | |
| 2020/0055252 | A1 | 2/2020 | Lewicki et al. | |
| 2020/0255660 | A1 | 8/2020 | Durand et al. | |
| 2021/0187839 | A1 | 6/2021 | Tandy et al. | |
| 2021/0213647 | A1 | 7/2021 | Watanabe et al. | |
| 2022/0082745 | A1 * | 3/2022 | Iwane | G02B 27/286 |
| 2023/0288692 | A1 | 9/2023 | Ravizza | |
| 2024/0094541 | A1 | 3/2024 | Voll et al. | |
| 2024/0160003 | A1 | 5/2024 | Ravizza et al. | |
| 2025/0199289 | A1 | 6/2025 | Ravizza | |

OTHER PUBLICATIONS

Restriction Requirement received in U.S. Appl. No. 17/565,314 dated Jun. 24, 2024, pp. all.

Barnyakov, Yua. , "Impact of polishing on the light scattering at aerogel surface", Nuclear Instruments and Methods in Physics Research Section A: Accelerators, Spectrometers, Detectors and Associated Equipment 824 (Nov. 29, 2015): 123-124.

Ferrazzi, Brunop. , "A study of mirrors for an Aerogel Ring Imaging Cherenkov detector", Diss. Faculty of Graduate Studies and Research, University of Regina, Aug. 2022.

Hotaling, et al., "Ultra-Low Density Aerogel Mirror Substrates", Rome Laboratory/OCPC, Apr. 1993.

Hrubesh, Lawrence W., "Aerogel applications", Journal of Non-Crystalline Solids 225 (Nov. 19, 1998): 335-342.

Kharzheev, Yun. , "Use of silica aerogels in Cherenkov counters", Physics of particles and nuclei 39 (Jan. 2008): 107-135.

International Search Report and Written Opinion for International Application No. PCT/US2024/029023 dated Feb. 20, 2025, 8 pages.

Klein, et al., "Additive Manufacturing of Optically Transparent Glass", 3D Printing and Additive Manufacturing vol. 2, No. 3., 2015, 92-105.

Lewicki, et al., "3D-Printing of Meso-structurally Ordered Carbon Fiber/Polymer Composites with Unprecedented Orthotropic Physical Properties", Scientific Reports 7, Article 43401, 2017, 1-14.

Tredway, Williamk. , "Carbon Fiber Reinforced Glass Matrix Composites for Satellite Applications", Final Report Contract No. N00014-89-C-0046 for Department of the Navy Office of Naval Research, United Technologies Research Center East Hartford, CT., 1992, 1-90.

Witzendorff, et al., "Additive manufacturing of glass: CO2-Laser glass deposition printing", ScienceDirect, Procedia CIRP 74, 2018, 272-275.

* cited by examiner

| Surface type | Comment | Radius | Thickness | Material | Conic | 4th Order Term | 6th Order Term | 8th Order Term | 10th Order Term | 12th Order Term |
|---|---|---|---|---|---|---|---|---|---|---|
| Even Asphere | L1 | 76.2286 | 20.000 | CaF2 | | -5.9285E-08 | -5.4010E-12 | -7.4954E-16 | -4.1603E-20 | |
| Sphere | L2 | 219.5818 | 6.000 | N-LAK34 | | | | | | |
| Sphere | space | 128.0995 | 9.7421 | | | | | | | |
| Plano | monolith | Inf | 56.3564 | Silica | | | | | | |
| Even Asphere | primary mirror | -245.6568 | -55.1266 | MIRROR | | 4.5736E-08 | 3.6525E-12 | -3.0123E-17 | 2.1035E19 | |
| Even Asphere | secondary mirror | -189.2811 | 55.1266 | MIRROR | | 2.554e-07 | -5.5798E-11 | -8.5818E-15 | 3.0475E-19 | |
| Even Asphere | primary refract | -245.6568 | 2.000 | CaF2 | | 4.5736E-08 | 3.6525E-12 | -3.0123E-17 | 2.1035E19 | |
| Sphere | L3 | -351.4604 | 2.000 | F2G12 | | | | | | |
| Even Asphere | L4 | 166.7673 | 29.843 | | | 3.3708e-06 | -1.2623E-10 | 2.6553E-12 | -6.9990E-15 | -2.6676E-17 |
| Plano | Image plane | Inf | | | | | | | | |

FIG. 3C

| Surface type | Comment | Radius | Thickness | Material | Conic | 4th Order Term | 6th Order Term | 8th Order Term | 10th Order Term | 12th Order Term |
|---|---|---|---|---|---|---|---|---|---|---|
| Even Asphere | schmidt plate | 173.7380 | 6.000 | CaF2 | | -5.8603E-07 | -9.7402E-11 | -5.086E-15 | -3.9213E-19 | |
| Plano | monolith | Inf | 50.0091 | Silica | | | | | | |
| Even Asphere | primary mirror | -175.661 | 47.4438 | MIRROR | | -1.3050E-07 | -1.0722E-11 | 1.1889E-15 | -9.6220E-16 | |
| Even Asphere | secondary mirror | -89.347 | -47.4438 | MIRROR | | -1.4741E-06 | -9.4244E-10 | -2.6894E-13 | 4.9039E-16 | |
| Sphere | primary refract | -175.661 | 47.4438 | SF6G05 | | -1.3050E-07 | -1.0722E-11 | 1.1889E-15 | -9.6220E-16 | |
| Even Asphere | field corrector | 68.939 | 23.0419 | | | 4.3377E-06 | -3.4077E-09 | -6.9259E-14 | -6.9256E-14 | |
| Plano | Image plane | Inf | | | | | | | | |

FIG. 3B

| Surface type | Comment | Radius | Thickness | Material | Conic | 4th Order Term | 6th Order Term | 8th Order Term | 10th Order Term | 12th Order Term |
|---|---|---|---|---|---|---|---|---|---|---|
| Even Asphere | schmidt plate | | | ZnSe | | -3.9532E-07 | -3.1674E-11 | -1.1985E-14 | 0.0000 | 0.0000 |
| Sphere | monolith | Inf | 62.2053 | ZnSe | | | | | | |
| Even Asphere | primary mirror | -208.2642 | | MIRROR | 9.9849 | 0.0000 | 2.6091E-11 | -3.6683E-15 | 2.5087E-18 | 0.0000 |
| Even Asphere | secondary mirror | -143.9683 | | MIRROR | 27.1004 | 0.0000 | 1.0883E-09 | -2.8115E-12 | 5.3574E-15 | 0.0000 |
| Even Asphere | field corrector | 2262.8456 | | ZnSe | | -3.1092E-07 | 2.4937E-09 | -3.2015E-11 | 1.3346E-13 | -1.9858E-16 |
| | cold aperture | 22.0000 | | | | | | | | |

FIG. 3A

Optical Properties

| | |
|---|---|
| Focal length | 200.0 units |
| Entrance pupil diameter | 100 units |
| F-number | 2.00 |
| Back focal length | 29.84 units |
| Wavelength | 0.5 to 2.5 microns |
| Image height | 14.8 units |
| Radial field | 3.5 degrees |

FIG. 4C

Optical Properties

| | |
|---|---|
| Focal length | 200.3 units |
| Entrance pupil diameter | 100 units |
| F-number | 2.00 |
| Back focal length | 23 units |
| Wavelength | 0.5 to 2.5 microns |
| Image height | 16 units |
| Radial field | 4.5 degrees |

FIG. 4B

Optical Properties

| | |
|---|---|
| Focal length | 103.6 units |
| Entrance pupil diameter | 74 units |
| F-number | 1.4 |
| Back focal length | 16.1 units |
| Wavelength | 4.0 microns |
| Image height | 12.72 units |
| Radial field | 7 degrees |

FIG. 4A

Example Prescriptions

Aspheric Prescription (Schmidt plate) =

$$-3.9532E\text{-}07*y^{4} - 3.1674E\text{-}11*y^{6} - 1.1985E\text{-}14*y^{8}$$

Aspheric Prescription (primary mirror) =

$$2.6091E\text{-}11*y^{6} - 3.6683E\text{-}15*y^{8} + 2.5087E\text{-}18*y^{10}$$

Aspheric Prescription (secondary mirror) =

$$1.0883E\text{-}09*y^{6} - 2.8115E\text{-}12*y^{8} + 5.3574E\text{-}15*y^{10}$$

Aspheric Prescription (field corrector) =

$$-3.1092E\text{-}07*y^{4} + 2.4937E\text{-}09*y^{6} - 3.2015E\text{-}11*y^{8} + 1.3346E\text{-}13*y^{10} - 1.9858E\text{-}16*y^{12}$$

FIG. 5A

Example Prescriptions

Aspheric Prescription (Schmidt plate) =

$$- 5.8603E\text{-}07*y^{4} - 9.7402E\text{-}11*y^{6} - 5.086E\text{-}15*y^{8} - 3.9213E\text{-}19*y^{10}$$

Aspheric Prescription (primary mirror) =

$$- 1.3050E\text{-}07*y^{4} - 1.0722E\text{-}11*y^{6} + 1.1889E\text{-}15*y^{8} -9.6220E\text{-}16*y^{10}$$

Aspheric Prescription (secondary mirror) =

$$- 1.4741E\text{-}06*y^{4} - 9.4244E\text{-}10*y^{6} - 2.6894E\text{-}13*y^{8} + 4.9039E\text{-}16*y^{10}$$

Aspheric Prescription (field corrector) =

$$+ 4.3377E\text{-}06*y^{4} + 3.4077E\text{-}09*y^{6} + 4.2602E\text{-}11*y^{8} - 6.9259E\text{-}14 *y^{10}$$

FIG. 5B

Example Prescriptions

Aspheric Prescription (L1-S1) =

$$- 5.9289E\text{-}08*y^{4} - 5.4010\text{-}12*y^{6} - 7.4594E\text{-}16*y^{8} - 4.1603E\text{-}20*y^{10}$$

Aspheric Prescription (primary mirror) =

$$+ 4.5736E\text{-}08*y^{4} + 3.6525E\text{-}12*y^{6} - 3.0123E\text{-}17*y^{8} + 2.1035E\text{-}19*y^{10}$$

Aspheric Prescription (secondary mirror) =

$$+ 2.5543E\text{-}07*y^{4} - 5.5798E\text{-}11*y^{6} - 8.5818E\text{-}16*y^{8} + 3.0475E\text{-}19*y^{10}$$

Aspheric Prescription (L2-S2) =

$$+ 3.3708E\text{-}06*y^{4} - 1.2623E\text{-}10*y^{6} + 2.6552E\text{-}12*y^{8} - 6.9990E\text{-}15*y^{10} - 2.6676E\text{-}17*y^{12}$$

FIG. 5C

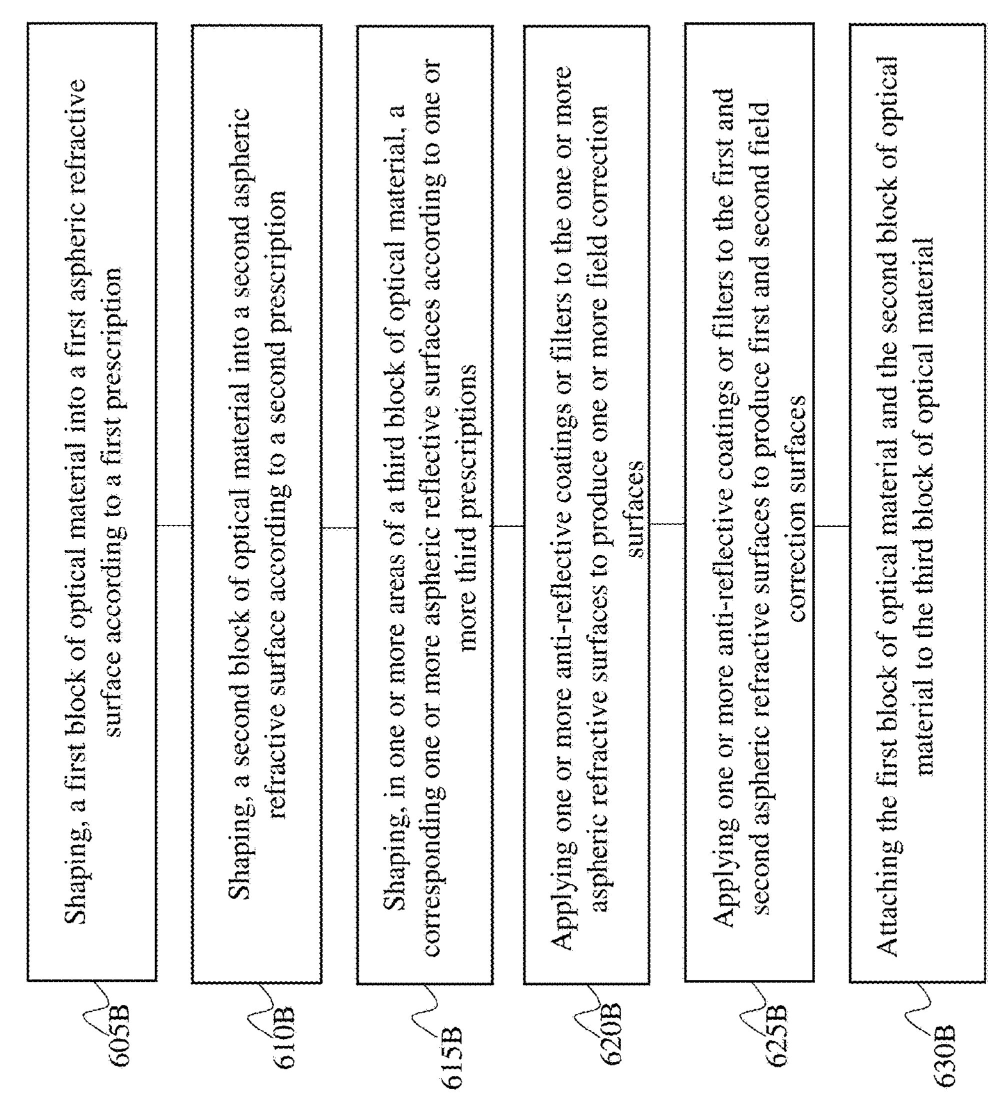
FIG.6B

Diffraction limited at 4micron wavelength up to field of view of +/-7deg.

Approximately 3x diffraction limited polychromatic wavelengths between 1.0 and 1.7 microns up to field of view of +/-4.5deg.

Diffraction limited on axis at 0.9 micron to 1.7 micron wavelength up to field of view of +/-3.5deg.

Approximately diffraction limited polychromatic wavelengths between 0.45 to 0.9 microns on-axis and 3x diffraction limited up to field of view of +/-3.5deg.

WIDEFIELD CATADIOPTRIC MONOLITHIC TELESCOPES

FEDERALLY SPONSORED RESEARCH OR DEVELOPMENT

This invention was made with Government support under Contract No. DE-AC52-07NA27344 awarded by the United States Department of Energy. The Government has certain rights in the invention.

TECHNICAL FIELD

The present disclosure relates to light-weight monolithic optics.

BACKGROUND

Many optical components have imperfections such as aberrations including spherical and comatic aberrations (coma) that reduce image quality. Correcting these aberrations is particularly important in space-based telescopes. Moreover, space-based telescopes can benefit from light-weight components and alignment that is not susceptible to change during space operations including space launch. New optical systems are needed with corrected aberrations that are light-weight, rigid, and stable in harsh environments. Also needed are techniques for making these optical systems for aerospace, space, defense, remote sensing, and imaging applications.

SUMMARY

Disclosed are apparatuses and methods related to compact optical telescopes that are mechanically strong with robust optical alignment and achieve a wide field of view, fast focal aperture ratio, and excellent image quality. In one aspect an apparatus is disclosed. The apparatus includes a first aspheric refractive surface defined by a first polynomial and positioned to receive input light, and a first aspheric mirror surface comprising a first reflective coating, the first mirror surface defined by a second polynomial and positioned to receive light from the first aspheric refractive surface. The apparatus further includes a second aspheric mirror surface comprising a second reflective coating, the second aspheric mirror surface defined by a third polynomial and positioned to receive light from the first aspheric mirror surface, and a second aspheric refractive surface defined by a fourth polynomial and positioned to receive light from the second aspheric mirror surface, wherein the first aspheric refractive surface, the first aspheric mirror surface, the second aspheric mirror surface, and the second aspheric refractive surface are arranged to have a fixed alignment with respect to each other as part of a monolithic structure.

In another aspect, a method of manufacturing an optical system is disclosed. The method includes shaping, in one or more first areas of a block of optical material, a corresponding one or more aspheric refractive surfaces according to one or more first prescriptions, and shaping, in one or more second areas of the block of optical material, a corresponding one or more aspheric reflective surfaces according to one or more second prescriptions. The method further includes applying one or more reflective coatings to the one or more aspheric reflective surfaces to produce one or more aspheric mirrors, and applying one or more anti-reflective coatings or filters to the one or more aspheric refractive surfaces to produce one or more field correction surfaces.

In another aspect, another of manufacturing an optical system is disclosed. The method includes shaping a first block of optical material into a first aspheric refractive surface according to a first prescription, shaping a second block of optical material into a second aspheric refractive surface according to a second prescription, and shaping, in one or more areas of a third block of optical material, a corresponding one or more aspheric reflective surfaces according to one or more third prescriptions. The method further includes applying one or more reflective coatings to the one or more aspheric reflective surfaces to produce one or more aspheric mirrors, and applying one or more anti-reflective coatings or filters to the first and second aspheric refractive surfaces to produce first and second field correction surfaces. The method includes attaching the first block of optical material and the second block of optical material to the third block of optical material.

In yet another aspect, another of manufacturing an optical system is disclosed. The method includes shaping a first block of optical material into a first aspheric and a first spheric refractive surfaces, and shaping a second block of optical material into a second spheric and a third spheric refractive surfaces according to a first prescription, and attaching the first block to the second block. The method further includes shaping a third block of optical material into a second aspheric and a fourth spheric refractive surfaces, and shaping a fourth block of optical material into a fifth spheric and a sixth spheric refractive surfaces according to a second prescription, and attaching the third block to the fourth block. The method includes shaping in one or more areas of a fifth block of optical material into one or more aspheric reflective surfaces according to one or more third prescriptions, wherein the fifth block is a monolith. The method includes applying one or more anti-reflective coatings or filters to the one or more aspheric refractive surfaces to produce one or more anti-reflective refractive surfaces for aberration correction, and applying one or more reflective coatings to the one or more aspheric reflective surfaces to produce one or more aspheric mirrors on the monolith. The method further includes attaching the attached first and second blocks of optical material and attached third and fourth blocks of optical material to the fifth block of optical material.

The following features can be included in various combinations. The first, second, third, and fourth polynomials each have non-zero coefficients for even order terms including at least a 4th order term, a 6th order term, and an 8th order term. The first and second aspheric mirror surfaces are at least partially defined by conic sections. The first, second, third, and fourth polynomials each have different coefficient values from each other. The first aspheric refractive surface is a Schmidt plate. The optical apparatus comprises zinc selenide (ZnSe). The first aspheric mirror surface has an aspherical concave shape and the second aspheric mirror surface has an aspherical convex shape. The optical apparatus is a Cassegrain telescope and the first aspheric mirror surface is a primary mirror of the Cassegrain telescope and the second aspheric mirror surface is a secondary mirror of the Cassegrain telescope. The first and second aspheric mirror surfaces include a metallic coating or one or more dielectric layers to cause the mirror surface to reflect light. The first and second aspheric refractive surfaces are coated with one or more of an anti-reflective coating or a wavelength filter.

BRIEF DESCRIPTION OF THE DRAWINGS

FIG. 3A shows a table with some of the features of the optical elements for the first example embodiment;

FIG. 3B shows another table with some of the features of the optical elements for the second example embodiment;

FIG. 3C shows another table with some of the features of the optical elements for the third example embodiment;

FIG. 4A is a table showing example parameter values for a simulation of the first example embodiment;

FIG. 4B is another table showing example parameter values for a simulation of the second example embodiment;

FIG. 4C is another table showing example parameter values for a simulation of the third example embodiment;

FIG. 5A shows example equations for aspheric prescriptions for elements for the first example embodiment;

FIG. 5B shows other example equations for aspheric prescriptions for elements for the second example embodiment;

FIG. 5C shows other example equations for aspheric prescriptions for elements for the third example embodiment;

FIG. 6B depicts a second example process for manufacturing an optical system that includes an aspheric refractive device and a planar corrector plate;

DETAILED DESCRIPTION

Figure 1A:
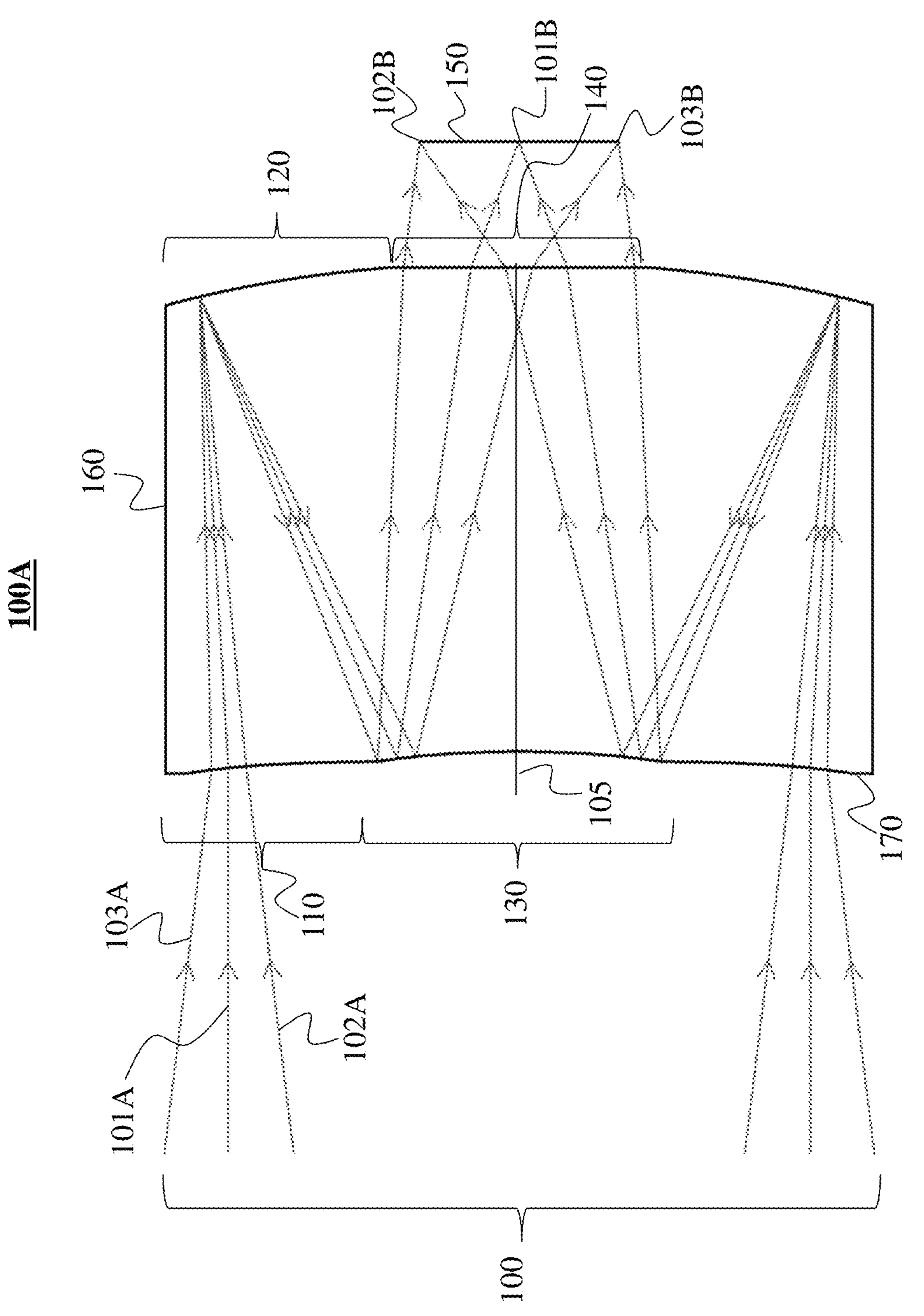
FIG. 1A depicts a first example embodiment of a Cassegrain telescope made using the disclosed monolithic optical technology.

Disclosed are apparatuses and methods for designing apparatuses including compact optical telescopes that are mechanically strong and have robust optical alignment and achieve a wide field of view and a fast focal aperture ratio and excellent image quality. The disclosed optical system includes an aspheric refractive surface and a planar corrector surface to correct for spherical and comatic aberrations. In some example embodiments the system is "monolithic" which means that the optical system is fabricated from a single block of optical material (e.g., glass, or other material). The disclosed monolithic system has important advantages over more conventional systems including improved aberration correction and improved strength and alignment robustness when deployed in extreme environments such as that experienced in spaceflight.

Earlier approaches to compact long focal length two-mirror Cassegrain type telescopes use aggressively curved (short radii of curvature) mirrors. However, such aggressively curved mirrors require alignment that is extremely high precision (less than 10 micrometer displacement errors). Engineering and manufacturing optomechanical structures to maintain such high precision alignment in a small size and mass package that also survives rocket acceleration during space launch is very difficult and costly. Meeting these requirements results in a high cost of manufacturing and a poor economy of scale when high volume production is required due the need to realign elements on the ground prior to launch or even while in orbit.

The disclosed monolithic telescopes simplify the optomechanical challenges of mechanical strength, stability, and optical alignment thereby making conventional optomechanical structures obsolete. Monolithic telescopes, such as a two-mirror Cassegrain telescope, have the two mirrors fabricated from a single substrate including a single monolithic block of transparent optical material. Such designs are small and tend to be immune to thermal drift or damage or change in alignment due to the acceleration of space launch. Earlier monolithic telescope designs have worked well for long focal lengths and high f-number telescopes but tended to have reduced image quality at a wide field of view (short focal lengths) or at fast focal ratios (low f-numbers), and when both short focal lengths and a low f-number are needed.

The disclosed monolithic telescopes achieve both a wide field of view and fast f-number within a monolithic substrate by incorporating an aspheric convex refractive first surface and a planar aspheric field corrector surface as the final refractive surface. These two refractive surfaces work in conjunction with a concave aspheric primary mirror and convex aspheric secondary mirror (e.g., Cassegrain telescope) to improve high-order off-axis aberration correction (e.g., coma, astigmatism) thereby permitting wider fields of view and at faster f-numbers. The foregoing additional refractive surfaces are fabricated into the monolithic substrate.

As further detailed below, the monolithic Cassegrain telescope detailed below can include an aspherical refractive surface such as a Schmidt plate and a planar corrector plate to reduce the effects of aberrations in the mirrors such as spherical and comatic aberration.

To further illustrate the features of the disclosed embodiments, telescopes and space-based optical systems are used throughout this patent document as examples to facilitate the understanding of the disclosed technology. However, applications for the disclosed techniques span beyond space-based telescopes, ground-based telescopes, or astronomy equipment, and include beam directors for lasers, consumer imaging devices, and other applications where alignment stability and aberration correction are important.

Monolithic telescopes generally refer to reflective telescopes fabricated using a single silica substrate. This approach provides exceptional mechanical stability because the relative position of the mirrors is permanently polished into the monolithic substrate and are inherently temperature insensitive due to the low coefficient of thermal expansion (CTE) of fused silica (0.5 ppm/K). Once fabricated, monolithic telescopes are mechanically robust and reliable because the mirrors will always be aligned, even after subject to extreme force like during a launch into space.

FIG. 1A depicts a first example embodiment of a Cassegrain telescope including aspheric first and second refractive surfaces and mirrors made using the monolithic optical technology. FIG. 1A shows a cross-sectional view of telescope 100A. Telescope 100 is circularly symmetric about axis 105. First aspheric refractive surface 110, first aspheric reflective surface 120, second aspheric reflective surface 130, and second aspheric refractive surface 140 are each circularly symmetric. As shown in FIG. 1A, input light including light rays 101A, 102A, and 103A enter telescope 100A at first aspheric refractive surface 110, pass through first aspheric refractive surface 110 to first aspheric reflective surface 120 which reflects the light to second aspheric reflective surface 130 which in turn reflects the light to second aspheric refractive surface 140 and on to focal plane 150. In a plane perpendicular to the cross-sectional view of FIG. 1A, first aspheric refractive surface 110 has the cross-sectional shape of an annulus with the interior radius determined by the second aspheric reflective surface 130, and an exterior radius determined by the outer diameter of the monolithic block. A small non-optical edge 170 lies between the outer diameter of the monolithic block and the outer diameter of the first reflective surface 110. The edge of the monolithic block of material is shown at 160. Shown at 101A is on axis input light into the catadioptric optical system (a system having both refractive and reflective elements) such as telescope 100. Shown at 102A is a maximum angular field entrance into the catadioptric optical system (telescope) 100. Shown at 103A is a minimum angular field entrance into the catadioptric optical system (telescope) 100A. Shown at 101B is the on-axis field focused at image plane 150 by the catadioptric optical system (telescope) 100A. Shown at 102B is the maximum angular field focused at image plane 150 by the catadioptric optical system (telescope) 100A. Shown at 103B is the minimum angular field focused at the image plane by catadioptric optical system (telescope) 100A.

As detailed below, an optical device such as the monolithic telescope shown in FIG. 1A can be fabricated by grinding a single monolithic block of glass. For example, the monolithic telescope in FIG. 1A can be fabricated from a monolithic block of glass that is ground to have different shaped surfaces in different areas of the monolithic block. In some example embodiments, the monolithic block is silica or zinc selenide (ZnSe), or other optically transparent material at a selected wavelength for the telescope.

For example, the rotationally symmetric area corresponding to the first aspheric refractive surface 110 (annulus in cross-sectional shape) can be ground according to a first prescription specifying the shape of the refractive surface. One or more coatings may be deposited on the first refractive surface to perform various functions such as an anti-reflection (AR) coating, wavelength filter, or other effect on the incoming light 101A, 102A, and 103A. In some example embodiments, the first aspheric refractive surface 110 may be referred to as a Schmidt plate.

The rotationally symmetric area corresponding to the first aspheric reflective surface 120 (annulus in cross-sectional shape) can be ground according to a second prescription specifying the shape of the reflective surface. After the monolithic block is ground according to the second prescription, a reflective coating may be deposited on the ground glass at causing the surface to become the first aspheric reflective surface 120. For example, a metal coating, or one or more dielectric coatings (e.g., a high refractive index coating or more coatings) may be added to the surface to make it reflective at a desired wavelength. Aspheric reflective surface 120 may be used as the primary mirror in a Cassegrain telescope as shown in FIG. 1A.

In the example of FIG. 1A, a second aspheric reflective surface 130 (circular in cross-sectional shape) may be ground according to a third prescription in a similar grinding and coating process as first aspheric reflective surface 120. Second aspheric reflective surface 130 may be used as the secondary mirror in as Cassegrain telescope as shown in FIG. 1A.

In the example of FIG. 1A, a second aspheric refractive surface 140 (circular in cross-sectional shape) may be ground according to a fourth prescription in a similar grinding and coating process as first aspheric refractive surface 110. In some example embodiments, second aspheric refractive surface 140 may be referred to as a field corrector plate.

Figure 1B:
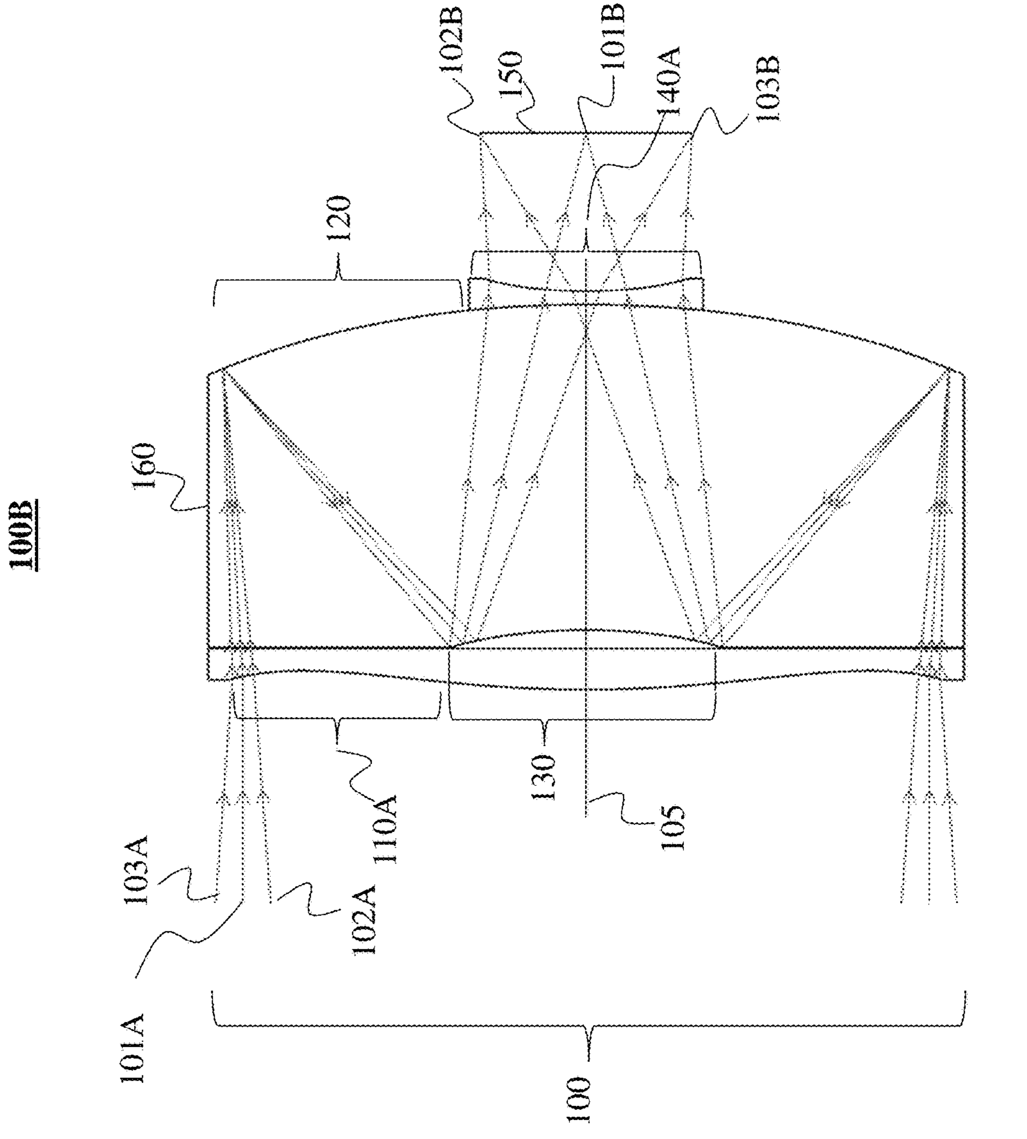
FIG. 1B depicts a second example embodiment of a Cassegrain telescope made using the disclosed monolithic optical technology.

FIG. 1B shows a second example embodiment with some of the same features as the embodiment shown in FIG. 1A. In the second embodiment, the first aspheric refractive surface 110A and the second aspheric refractive 140A are separate optical elements that are cemented to the monolithic block. In some example embodiments, aspheric refractive surfaces 110A and 140A can be made from the same material as the monolithic block and in some embodiments, they can be made from a different optical material. Aspheric refractive surfaces 110A and 140A can be made from different materials from each other as well. Aspheric refractive surfaces 110A and 140A are rotationally symmetric similar to 110 and 140 in FIG. 1A. Aspheric refractive surfaces 110A and 140A can be cemented to the monolithic block using an optically transparent glue or other means of attachment. Aspheric refractive surfaces 110A and 140A can be shaped by grinding or other techniques described with respect to FIG. 1A.

Figure 1C:
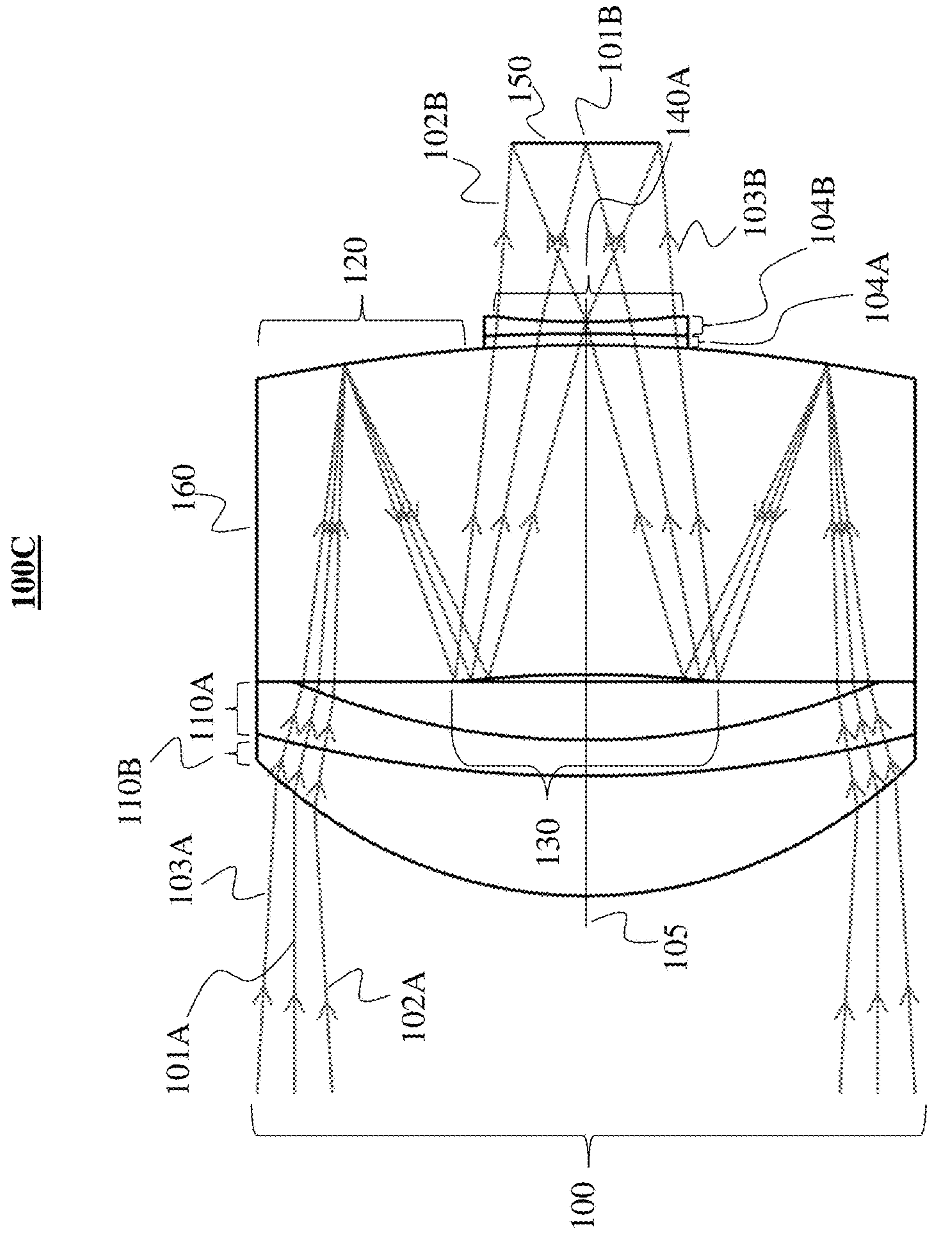
FIG. 1C depicts a third example embodiment of a Cassegrain telescope made using the disclosed monolithic optical technology.

FIG. 1C shows a third example embodiment with some of the same features as the embodiments shown in FIGS. 1A and 1B. In the third embodiment, first aspheric refractive surfaces 110A and 110B form a lens doublet that has 110A and 110B cemented together and cemented to the monolithic block. The second aspheric refractive surfaces 140A and 140B form another lens doublet that has 140A and 140B cemented together and cemented to the monolithic block. In some example embodiments, aspheric refractive surfaces 110A/110B and 140A/140B can be made from the same material as the monolithic block and in some embodiments, they can be made from different optical materials. Aspheric refractive surfaces 110A/110B and 140A/140B can be made from different materials from each other as well. Aspheric refractive surfaces 110A/110B and 140A/140B are rotationally symmetric similar to 110 and 140 in FIG. 1A. Aspheric refractive surfaces 110A/110B and 140A/140B can be cemented to the monolithic block using an optically transparent glue or other means of attachment. Aspheric refractive surfaces 110A/110B and 140A/140B can be shaped by grinding or other techniques described with respect to FIG. 1A.

In the foregoing description, the first and second refractive surfaces and the first and second reflective surfaces were ground using a grinder such as a diamond grinder or other type of grinding apparatus. The effect of grinding can also be performed using other tools. In some example embodiments, the various prescriptions in the various areas of the monolithic block can be imparted onto the monolithic block by a molding process, or by heating and reshaping the monolithic block to conform the various prescriptions in the various areas. Optical polishing can be used as a finishing step in the fabrication process or can be used in imparting one or more prescriptions onto the monolithic block.

In some example embodiments, light passes through first aspheric refractive surface 110 which is a convex refractive surface before impinging on the first aspheric reflective surface 120 which may be a primary mirror of a Cassegrain telescope. In some example embodiments, first aspheric refractive surface 110 is a Schmidt plate. The first aspheric refractive surface 110 corrects for spherical and comatic aberrations that may be later introduced by the primary mirror. The shape of the surface of the aspheric refractive surface 110 can be defined by a polynomial that includes even order terms (2nd, 4th, 6th, 8th, 10th, etc.). Even order terms are symmetric about an axis whereas odd order terms are not. The aspheric refractive surface 110 is ground by a grinding device from glass to have a shape as a function of radius that is defined by the polynomial which may be referred to as a prescription. As such, the shape of the first aspheric refractive surface 110 is radially symmetric. The shape of the first refractive surface 110 can be ground by, for example, a diamond grinding tool or using other techniques as described above.

In some example embodiments, the first reflective surface 120 such as a primary mirror can be a concave aspheric mirror if defined as such by the corresponding second prescription and the second aspheric reflective surface 130 such as a secondary mirror can be a convex aspheric mirror if defined as such by the corresponding third prescription. Each of the second and third prescriptions has an associated polynomial with 2nd, 4th, 6th, 8th, 10th, etc. order terms. After the secondary mirror, light passes to the second aspheric refractive 140 such as a planar corrector plate. The shape of the surface of the planar corrector plate can be defined by a polynomial that also includes even order terms (2nd, 4th, 6th, 8th, 10th, etc.). The polynomial coefficients defining the planar corrector plate 140 can be different from the coefficients of the first aspheric refractive surface 110, first aspheric reflective surface 110, and/or second reflective surface 120.

The second reflective surface 130 such as a secondary mirror focuses the light at 150 through second refractive surface 140. The focused light is detected by an optical detector such as a camera, photodiode array, or photomultiplier device.

The coefficients for each of the terms in each of the polynomials defining the shapes of the refractive and reflective surfaces may be determined via applying one or more goals or metrics to a computer simulation of the telescope. Examples of goals or metrics include f-number and telescope focal length. For example, a goal could include a short focal length with a representative focal length goal value and/or a low f-number with a representative f-number goal value. In some example embodiments, the computer simulation adjusts the coefficients of one or more of the coefficients of the various polynomials, evaluates the f-number and focal length against the goal values for each, followed by adjusting one or more of the coefficients again. The performance against the goals is stored in memory for each iteration of the adjusted coefficients. The simulation process may select coefficient values for the polynomials randomly or the coefficients may be selected using mathematical optimization techniques.

Figure 2:
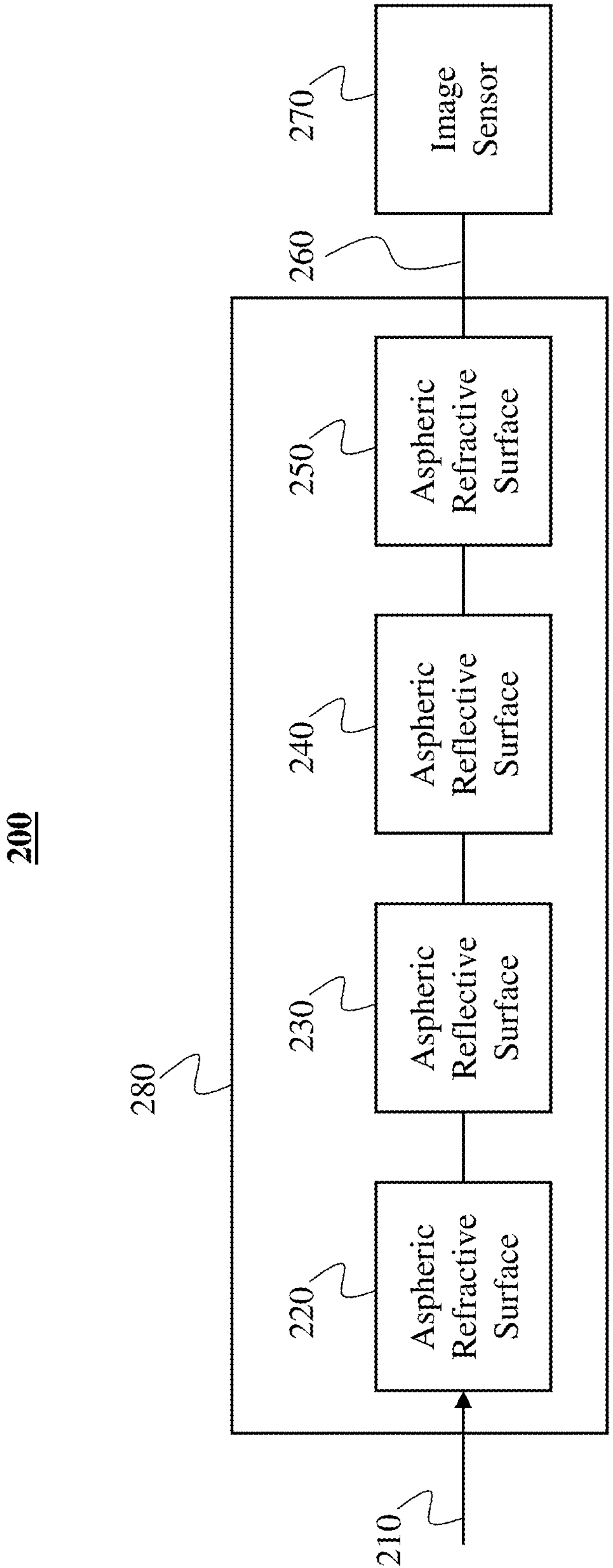
FIG. 2 depicts an example of an optical flow diagram.

FIG. 2 depicts an example of an optical flow diagram in an optical system 200. Input light 210 enters a catadioptric system 280 such as a telescope. The input light 210 first passes through first aspheric refractive surface 220. The shape of the surface of the aspheric refractive surface 220 may be defined by a polynomial with even order terms which can include a Schmidt plate. The light then passes to aspheric reflective surface 230 which focuses and directs the light to aspheric reflective surface 240. Aspheric reflective surface 230 can be a primary mirror of a Cassegrain telescope and reflective surface 240 can be a secondary mirror. The first and second reflective surfaces may be defined at least in part by a conic section. The light is then passed through another aspheric refractive surface 250 which can be a planar corrector plate. The surface of the aspheric refractive surface 250 may be defined by a polynomial with even order terms. Output light 260 is then passed to an image sensor 270 as described above.

FIG. 3A shows an example of a table of features of the optical elements for a first example embodiment of a catadioptric system. FIGS. 3B and 3C shows examples of tables of features of the optical elements for a second and third example embodiment of a catadioptric system, respectively. Each row (from top to bottom) in the table corresponds to a location further along the optical path from the input light toward the final image. The first row describes the first aspherical refractive surface with even coefficients including a Schmidt plate. The monolithic block of material is zinc selenide (ZnSe). In the example of FIG. 3A, the first aspherical refractive surface has no-zero coefficients for the 4th, 6th, and 8th order polynomial terms. The coefficients for the 0th, 12th, and higher order terms are zero. The third row corresponds to the first aspheric reflective surface or primary mirror. The first aspheric reflective surface has non-zero values for the conic section, and 6th, 8th, and 10th order polynomial coefficients. The fourth row corresponds to the second aspheric reflective surface or secondary mirror and has non-zero values for the conic section and 6th, 8th, and 10th order polynomial coefficients. The fifth row corresponds to the second aspheric refractive surface and has non-zero coefficient values for the 4th, 6th, 8th, 10th, and 12th order polynomial terms. The values of the coefficients and conic section values are provided as an illustrative example of the disclosed subject matter. The specific values for any other system depend on the specific system design and optimization goals with will result in different coefficient values.

FIG. 4A is a table showing example values for optical properties used in a first example embodiment of a catadioptric system and used in a simulation of the first example embodiment. FIGS. 4B and 4C are example tables showing example values for optical properties used in simulations of the second and third example embodiments of a catadioptric system, respectively. The values shown are for example systems presented for illustration purposes. Other example systems incorporating the disclosed subject matter will have different values dependent on the design goals and optimization performed.

FIG. 5A shows the polynomials corresponding to the example aspheric refractive and reflective surfaces in FIG. 3A. FIG. 5B shows the polynomials corresponding to the example aspheric refractive and reflective surfaces in FIG. 3B. FIG. 5C shows the polynomials corresponding to the example aspheric refractive and reflective surfaces in FIG. 3C. The "y" in the equations corresponds to a distance or displacement such as a radial displacement from a predefined starting location.

In the foregoing figures, a Cassegrain telescope was produced using the disclosed techniques. Other optical systems can also be produced which may have more than two aspheric reflective surfaces (e.g., mirrors) and may include more than two refractive surfaces. In such configurations, similar elements and processes may be used to produce a system. The disclosed techniques can be applied to systems using monolithic aspheric mirrors where aspheric refractive surfaces (e.g., Schmidt plates, planar corrector plates) enable improved performance, as well as any other type of optical system (i.e., telescope or other optical system) and catadioptric systems which combine one or more integrated refractive elements (e.g., lenses or refractive correction plates, Schmidt plates). In some embodiments, the disclosed techniques may be used to similarly produce a single optical component (e.g., single reflective or refractive surface). Such configurations may be beneficial in, for example, applications where manufacturing of a large optical component with a low weight is desired.

Figure 6A:
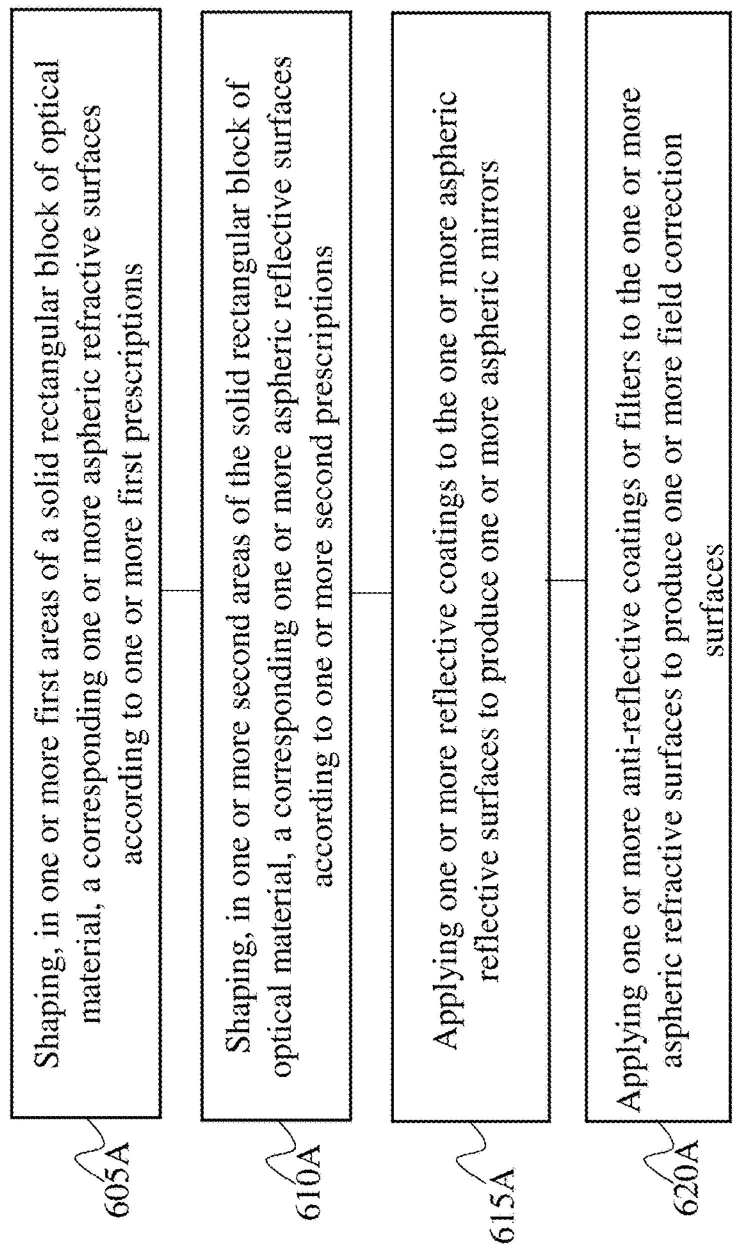
FIG. 6A depicts a first example process for manufacturing an optical system that includes an aspheric refractive device and a planar corrector plate.

FIG. 6A depicts a process 600A for manufacturing an optical system that includes one or more aspheric refractive surfaces and one or more aspheric reflective surfaces using a single monolithic block of optical material, in accordance with some example embodiments. At 605A, the method includes shaping, in one or more first areas of a solid rectangular block of optical material, a corresponding one or more aspheric refractive surfaces according to one or more first prescriptions. At 610A, the method includes shaping, in one or more second areas of the solid rectangular block of optical material, a corresponding one or more aspheric reflective surfaces according to one or more second prescriptions. As described above, the shaping may be performed by grinding or other technique. At 615A, the method includes applying one or more reflective coatings to the one or more aspheric reflective surfaces to produce one or more aspheric mirrors. At 620, the method includes applying one or more anti-reflective coatings or filters to the one or more aspheric refractive surfaces to produce one or more field correction surfaces. FIG. 6A details incorporating an aspheric refractive device and planar corrector plate as described above and in FIGS. 1A, 2, 3A, 4A, and 5A into a monolithic block of optical material such as ZnSe or other glass. The foregoing aspheric refractive and reflective surfaces can also be incorporated into other fabrication methods such as molding as described above.

FIG. 6B depicts another process 600B for manufacturing an optical system that includes one or more aspheric refractive surfaces and one or more aspheric reflective surfaces. At 605B, the method includes shaping a first block of optical material into a first aspheric refractive surface according to a first prescription. At 610B, the method includes shaping a second block of optical material into a second aspheric refractive surface according to a second prescription. At 615B, the method includes shaping, in one or more areas of a third block of optical material, a corresponding one or more aspheric reflective surfaces according to one or more third prescriptions. At 620B, the method includes applying one or more reflective coatings to the one or more aspheric reflective surfaces to produce one or more aspheric mirrors. At 625B, the method includes applying one or more anti-reflective coatings or filters to the first and second aspheric refractive surfaces to produce first and second field correction surfaces. At 630B, the method includes attaching the first block of optical material and the second block of optical material to the third block of optical material. FIG. 6B details incorporating an aspheric refractive device and planar corrector plate as described above and in FIGS. 1B, 2, 3B, 4B, and 5B as cemented elements onto a monolithic block of optical material such as ZnSe or other glass. The foregoing aspheric refractive and reflective surfaces can also be incorporated into other fabrication methods such as molding as described above.

Figure 6C:
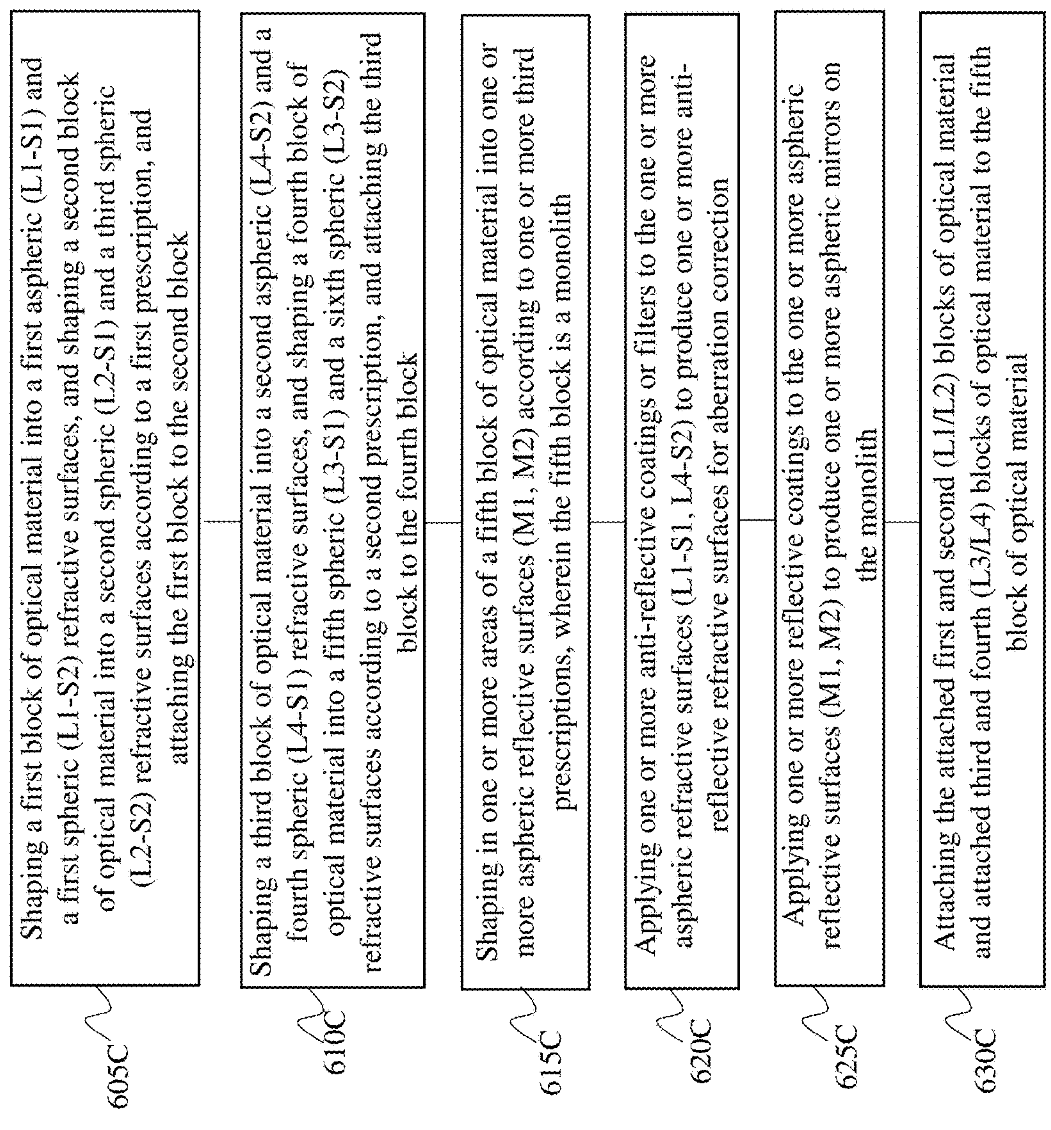
FIG. 6C depicts a third example process for manufacturing an optical system that includes an aspheric refractive device and a planar corrector plate.

FIG. 6C depicts another process 600C for manufacturing an optical system that includes one or more aspheric refractive surfaces and one or more aspheric reflective surfaces. At 605C, the method includes shaping a first block of optical material into a first aspheric (L1-S1) and a first spheric (L1-52) refractive surfaces, and shaping a second block of optical material into a second spheric (L2-S1) and a third spheric (L2-S2) refractive surfaces according to a first prescription, and attaching the first block to the second block. At 610C, the method includes shaping a third block of optical material into a second aspheric (L4-S2) and a fourth spheric (L4-S1) refractive surfaces, and shaping a fourth block of optical material into a fifth spheric (L3-S1) and a sixth spheric (L3-S2) refractive surfaces according to a second prescription, and attaching the third block to the fourth block. At 615C, the method includes shaping in one or more areas of a fifth block of optical material into one or more aspheric reflective surfaces (M1, M2) according to one or more third prescriptions, wherein the fifth block is a monolith. At 620B the method includes applying one or more anti-reflective coatings or filters to the one or more aspheric refractive surfaces (L1-S1, L4-S2) to produce one or more anti-reflective refractive surfaces for aberration correction. At 625C, the method includes applying one or more reflective coatings to the one or more aspheric reflective surfaces (M1, M2) to produce one or more aspheric mirrors on the monolith. At 630C, the method includes attaching the attached first and second (L1/L2) blocks of optical material and attached third and fourth (L3/L4) blocks of optical material to the fifth block of optical material. FIG. 6C details incorporating an aspheric refractive device and planar corrector plate as described above and in FIGS. 1C, 2, 3C, 4C, and 5C as cemented elements onto a monolithic block of optical material such as ZnSe or other glass. The foregoing aspheric refractive and reflective surfaces can also be incorporated into other fabrication methods such as molding as described above.

Figure 7A:
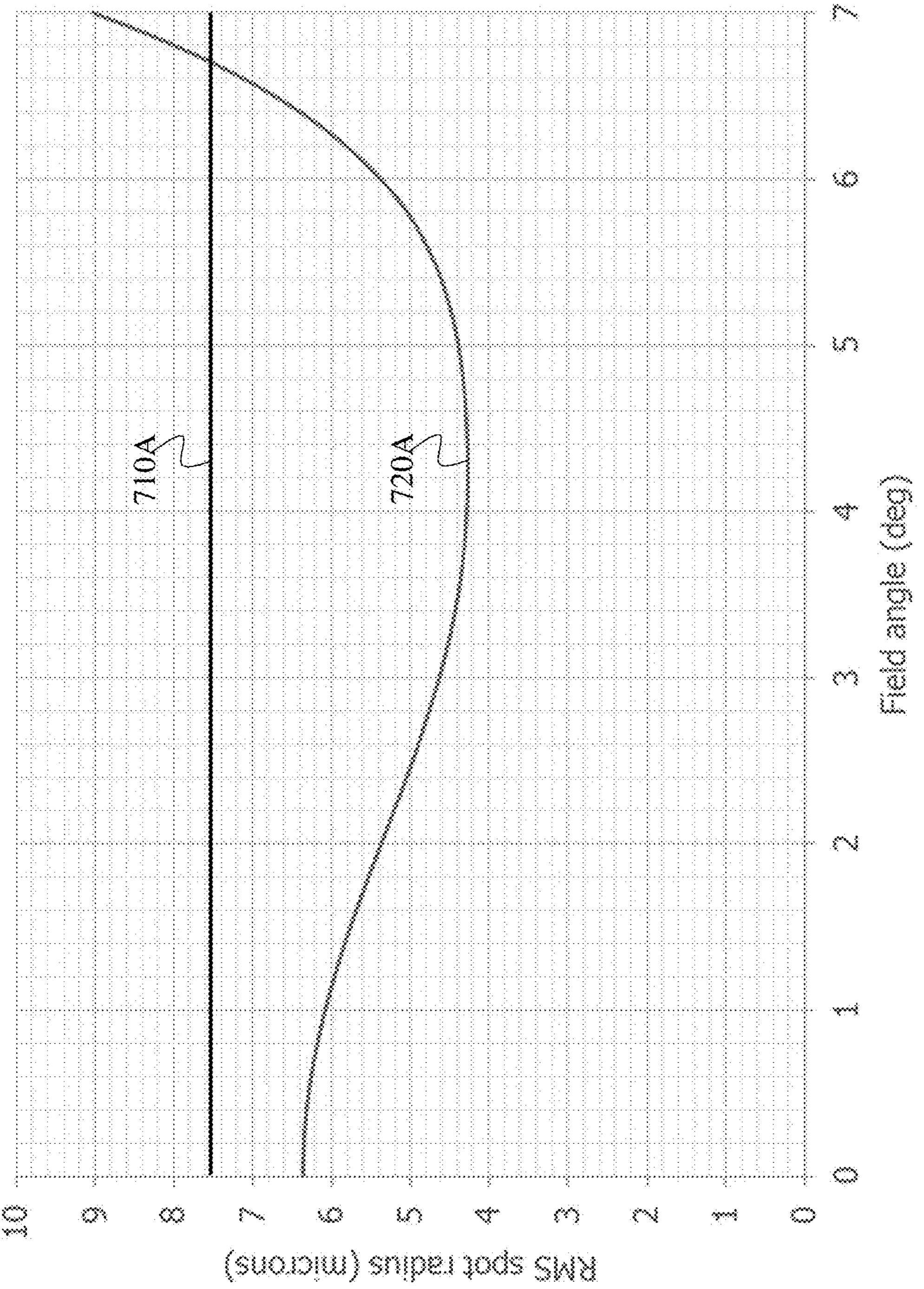
FIG. 7A depicts an example plot of spot radius vs. field angle in degrees for the first example embodiment.

FIG. 7A depicts an example plot of root mean square (RMS) spot radius vs. field of view (FOV) in degrees for a first example embodiment. FIG. 7A at 710A shows the diffraction limit for light with a wavelength of 4 microns. Plot line 720A shows the performance of the system described in FIGS. 1A, 2, 3A, 4A, 5A and 6A. Plot line 720A shows excellent performance with the RMS spot radius being below the diffraction limit. Excellent performance is seen to about +/−7 degrees field FOV.

Figure 7B:
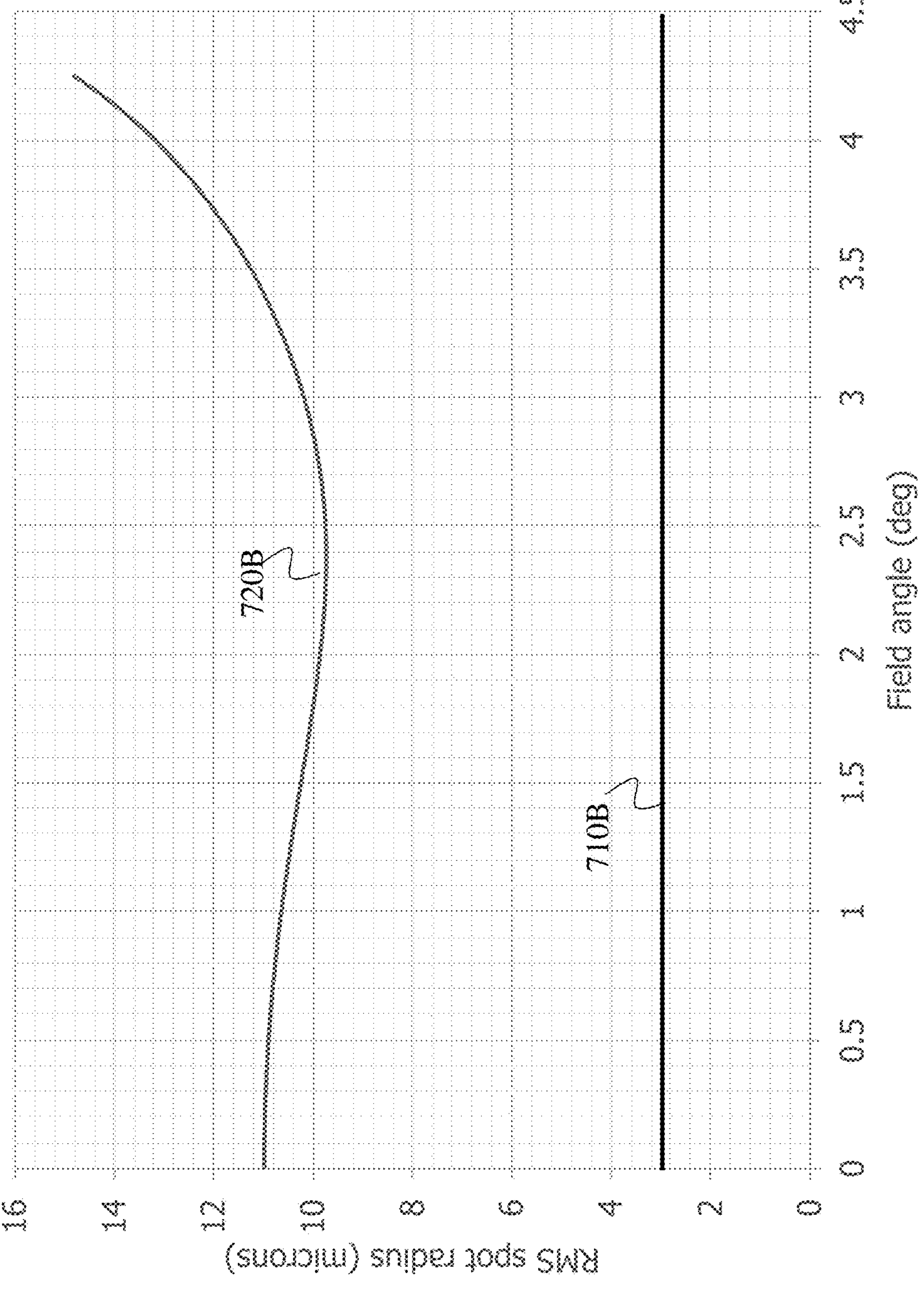
FIG. 7B depicts an example plot of spot radius vs. field angle in degrees for the second example embodiment.

FIG. 7B depicts an example plot of root mean square (RMS) spot radius vs. FOV in degrees for a second example embodiment. FIG. 7B at 710B shows the diffraction limit for light with a wavelength between about 1.0-1.7 microns. Plot line 720B shows the performance of the system described in FIGS. 1B, 2, 3B, 4B, 5B and 6B. Plot line 720B shows excellent performance with the RMS spot radius being slightly above the diffraction limit. Excellent performance is seen to about +/−4.5 degrees field FOV.

Figure 8:
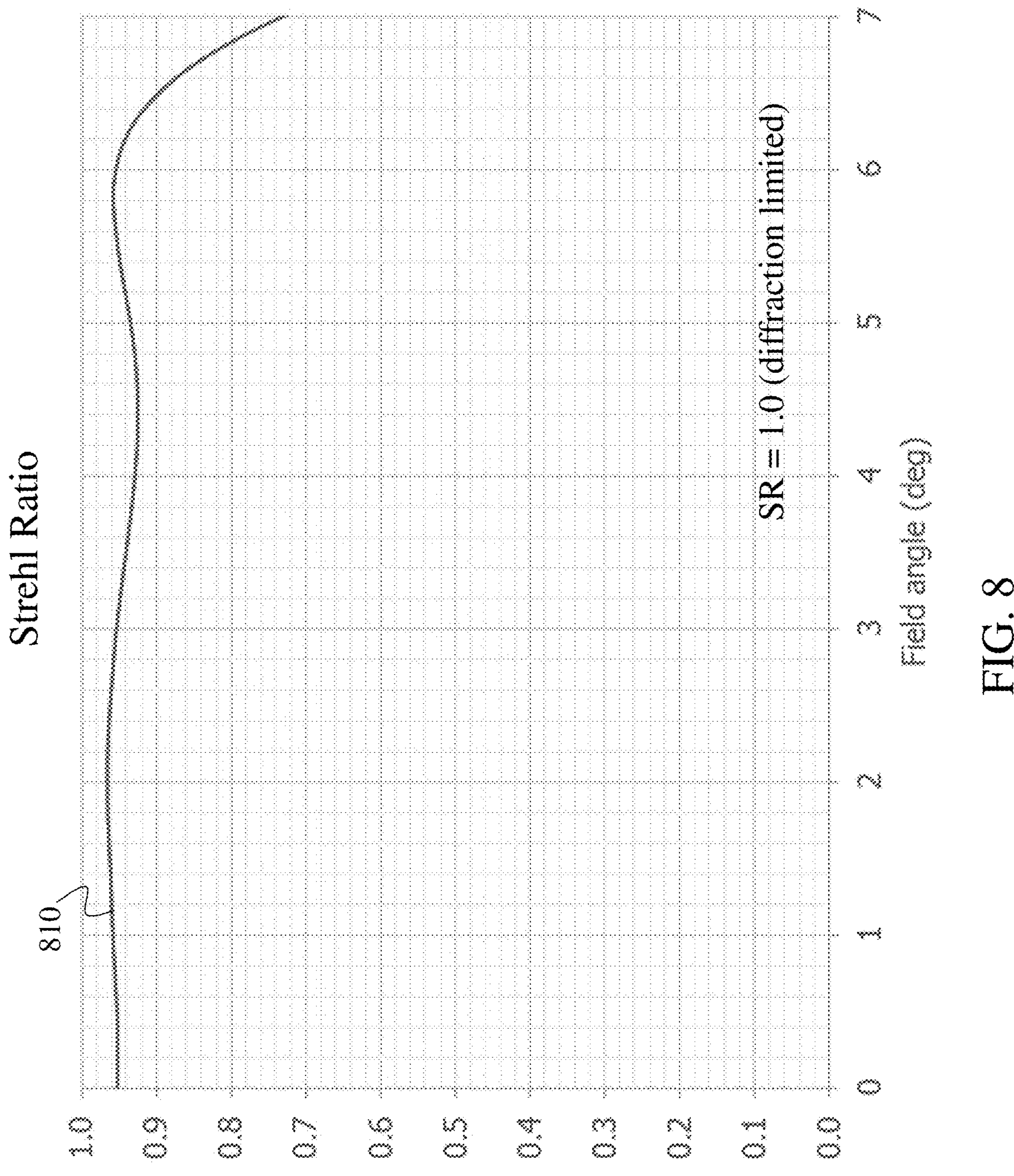
FIG. 8 depicts an example plot of a Strehl ratio for the first example embodiment.

FIG. 8 depicts an example plot of the Strehl ratio vs. FOV in degrees for the first embodiment. A Strehl ratio of 1.0 corresponds to the diffraction limit and is the best possible (unobtainable) performance. Lower performance is indicated by a lower Strehl ratio. Plot line 810 shows excellent performance to about +/−7 degrees FOV.

Figure 9A:
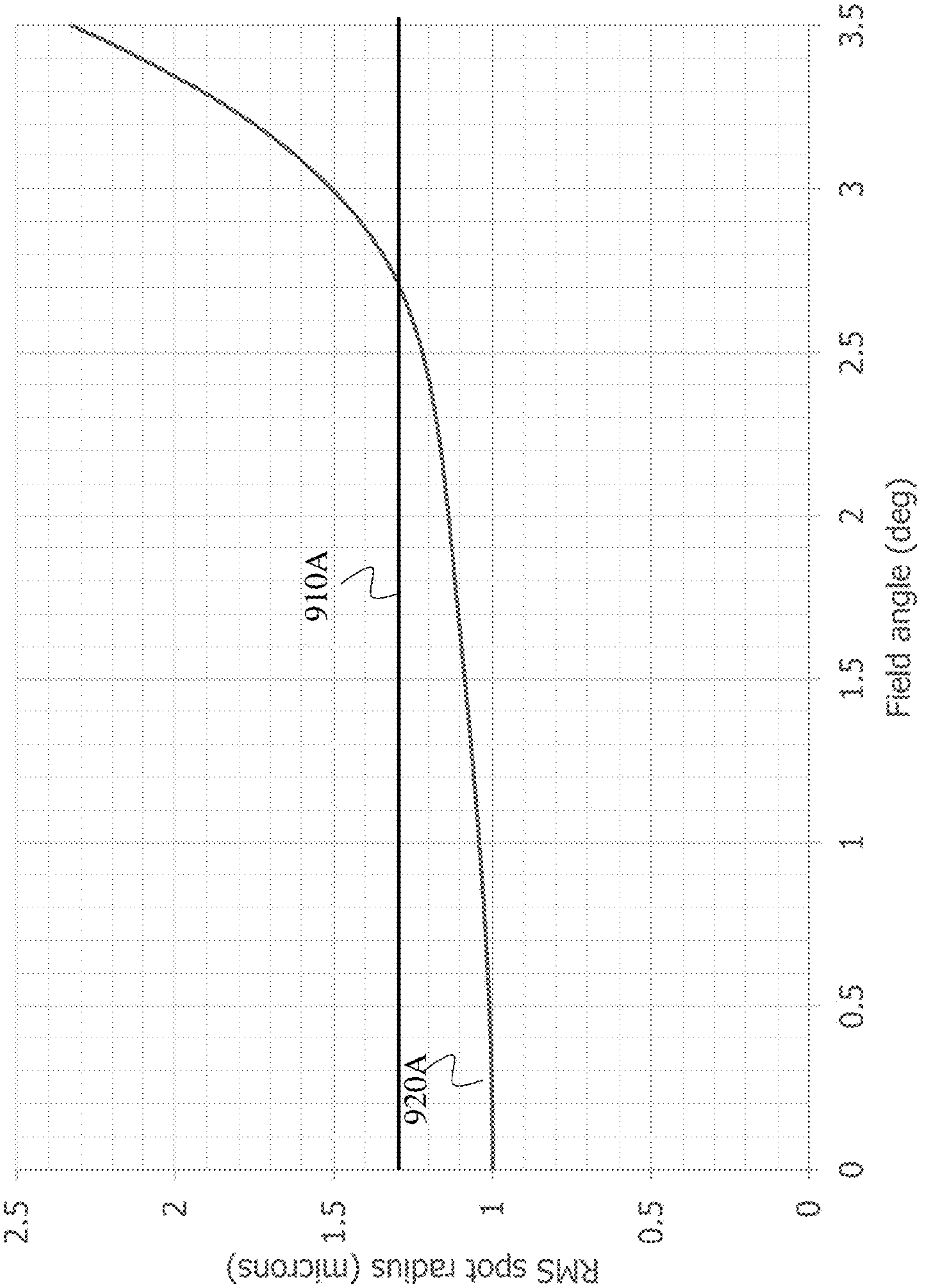
FIG. 9A depicts an example plot of spot radius vs. field angle in degrees for the third example embodiment.

FIG. 9A depicts an example plot of root mean square (RMS) spot radius vs. FOV in degrees for the third example embodiment. FIG. 9A at 910A shows the diffraction limit for light with a wavelength between about 0.9-1.7 microns. Plot line 920A shows the performance of the system described in FIGS. 1C, 2, 3C, 4C, 5C and 6C. Plot line 920A shows excellent performance with the RMS spot radius being slightly above the diffraction limit. Excellent performance is seen to about +/−3.5 degrees field FOV.

Figure 9B:
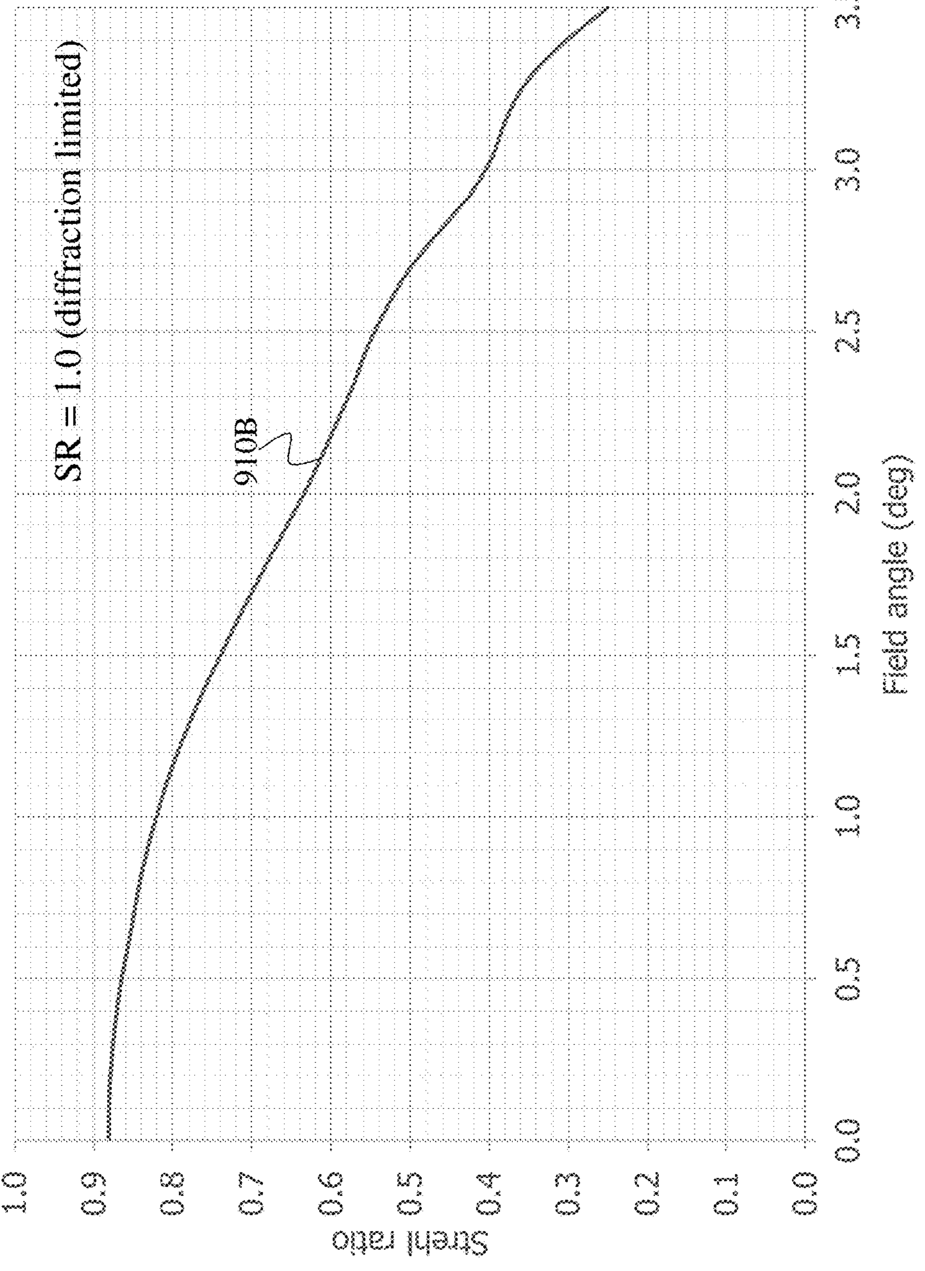
FIG. 9B depicts an example plot of a Strehl ratio for the third embodiment.

FIG. 9B depicts an example plot of the Strehl ratio vs. FOV in degrees for the third example embodiment, in accordance with some example embodiments. A Strehl ratio of 1.0 corresponds to the diffraction limit and is the best possible (unobtainable) performance. Lower performance is indicated by a lower Strehl ratio. Plot line 910B shows excellent performance to about +/−3.5 degrees FOV at wavelengths between 0.45-0.9 microns.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Only a few implementations and examples are described and other implementations, enhancements and variations can be made based on what is described and illustrated in this patent document. Moreover, the separation of various system components in the embodiments described in this patent document should not be understood as requiring such separation in all embodiments.

What is claimed is:

1. An optical apparatus, comprising:

a first aspheric refractive surface defined by a first polynomial and positioned to receive input light;

a first aspheric mirror surface comprising a first reflective coating, the first aspheric mirror surface defined by a second polynomial and positioned to receive light from the first aspheric refractive surface;

a second aspheric mirror surface comprising a second reflective coating, the second aspheric mirror surface defined by a third polynomial and positioned to receive light from the first aspheric mirror surface; and a second aspheric refractive surface defined by a fourth polynomial and positioned to receive light from the second aspheric mirror surface, the fourth polynomial configuring the second aspheric refractive surface as a field corrector plate, wherein the first aspheric refractive surface, the first aspheric mirror surface, the second aspheric mirror surface, and the second aspheric refractive surface are arranged to have a fixed alignment with respect to each other as part of a monolithic structure, wherein the first polynomial configures a shape of the first aspheric refractive surface and the fourth polynomial configures a shape of the field corrector plate, the shape of the first aspheric refractive surface and the shape of the field corrector plate together compensating for one or more of spherical, comatic, field, or astigmatic aberrations introduced by at least the first aspheric mirror surface, wherein the shape of the first aspheric refractive surface and the shape of the field corrector plate are configured to correct high-order off-axis aberrations including at least coma and astigmatism introduced by the first and second aspheric mirror surfaces, and wherein correction of the high-order off-axis aberrations by the first aspheric refractive surface and the field corrector plate enables the optical apparatus to operate with a wide field of view at a fast focal ratio in the monolithic structure.

2. The optical apparatus of claim 1, wherein the first, second, third, and fourth polynomials each have non-zero coefficients for even order terms including at least a 4th order term, a 6th order term, and an 8th order term.

3. The optical apparatus of claim 1, wherein the first and second aspheric mirror surfaces are at least partially defined by conic sections.

4. The optical apparatus of claim 1, wherein the first, second, third, and fourth polynomials each have different coefficient values from each other.

5. The optical apparatus of claim 1, wherein the optical apparatus comprises zinc selenide (ZnSe).

6. The optical apparatus of claim 1, wherein the first aspheric mirror surface has an aspherical concave shape and the second aspheric mirror surface has an aspherical convex shape.

7. The optical apparatus of claim 1, wherein the optical apparatus is a Cassegrain telescope and the first aspheric mirror surface is a primary mirror of the Cassegrain telescope and the second aspheric mirror surface is a secondary mirror of the Cassegrain telescope.

8. The optical apparatus of claim 1, wherein the first and second aspheric mirror surfaces include a metallic coating or one or more dielectric layers to cause the first and second aspheric mirror surfaces to reflect light.

9. The optical apparatus of claim 1, wherein the first and second aspheric refractive surfaces are coated with one or more of an anti-reflective coating or a wavelength filter.

10. A method of manufacturing an optical system, the method comprising:

shaping, in a plurality of first areas of a block of optical material, a first aspheric refractive surface and a second aspheric refractive surface according to a plurality of first prescriptions, wherein the second aspheric refractive surface is configured as a field corrector plate;

shaping, in one or more second areas of the block of optical material, a first aspheric mirror surface and a second aspheric mirror surface according to one or more second prescriptions, wherein the first aspheric refractive surface is positioned to receive input light, the first aspheric mirror surface is positioned to receive light from the first aspheric refractive surface, the second aspheric mirror surface is positioned to received light from the first aspheric mirror surface, and the second aspheric refractive surface is positioned to receive light from the second aspheric mirror surface;

applying one or more reflective coatings to each of the first aspheric mirror surface and the second aspheric mirror surface; and applying one or more anti-reflective coatings or filters to each of the first aspheric refractive surface and the second aspheric refractive surface to produce one or more field correction surfaces including the field corrector plate, wherein the first aspheric refractive surface and the field corrector plate together are configured to compensate for one or more of spherical, comatic, field, or astigmatic aberrations introduced by at least the first aspheric mirror surface, wherein the first aspheric refractive surface and the field corrector plate are shaped according to the plurality of first prescriptions to correct high-order off-axis aberrations including at least coma and astigmatism introduced by the first and second aspheric mirror surfaces, and wherein correction of the high-order off-axis aberrations by the first aspheric refractive surface and the field corrector plate enables wide field of view operation at a fast focal ratio in a monolithic catadioptric optical system.

11. The method of claim 10, wherein each of the plurality of first prescriptions includes a polynomial, the polynomial defining a corresponding aspheric surface and having non-zero coefficients for even order terms including at least a 4th order term, a 6th order term, and an 8th order term.

12. The method of claim 10, wherein each of the one or more second prescriptions includes a polynomial, the polynomial defining a corresponding aspheric surface and having non-zero coefficients for even order terms including at least a 4th order term, a 6th order term, and an 8th order term.

13. The method of claim 10, wherein each of the first and second prescriptions is different from each other.

14. The method of claim 10, wherein the block comprises zinc selenide (ZnSe).

15. The method of claim 10, wherein the optical system is a Cassegrain telescope.

* * * * *